April 16, 1968 | R. GAGNIER ETAL | 3,378,642

LINE LOCKOUT CIRCUIT

Filed Aug. 10, 1964 | 2 Sheets-Sheet 1

LINE LOCKOUT CIRCUIT

Filed Aug. 10, 1964 2 Sheets-Sheet 2

United States Patent Office 3,378,642

Patented Apr. 16, 1968

3,378,642

LINE LOCKOUT CIRCUIT

Real Gagnier, Hull, Quebec, and Robert Kenedi and William C. Klassen, Ottawa, Ontario, Canada, assignors to Northern Electric Company Limited, Montreal, Quebec, Canada Filed Aug. 10, 1964, Ser. No. 388,426
14 Claims. (Cl. 179—18)

ABSTRACT OF THE DISCLOSURE

A lockout system for one of a plurality of lines, preferably in a telephone system, in which each of the plurality of lines is individually accessible to one another is described. A lockout relay is provided in connection with at least one of the lines, and a marginal relay is provided in central equipment whereby the prolonged appearance of a reference potential condition on any one of the lines causes operation to connect the marginal relay to that line. If the lockout relay is associated with that one line current flow is sufficient to operate the marginal relay which then initiates action to break connection between itself and the lockout relay, and causes the lockout relay to be held by connection to a conductor carrying the reference potential.

This invention relates to telephone systems and in particular those having common control type central offices.

In these systems much of the equipment is shared in common by the subscribers, it is complex and expensive, and it is desirable that it should be used only when required and not be tied up unnecessarily. Instances in which the equipment may be uselessly employed occur when there is a permanent off-hook signal arising from a short on a subscriber's line, or merely by the subscriber leaving the handset off the hook. In multiparty lines the off-hook permanent signal is even more common. Since the common equipment is designed for normal traffic, even a fairly small number of permanent signals may completely block the traffic in a central office.

It is one object of the present invention to render such permanent signals inoperative in holding up the common equipment, and to achieve this by automatic locking out circuit which will prevent an offending line from maintaining contact with important central equipment after it has delivered the off-hook or a permanent ground signal for a certain length of time without interruption such as by dialing, or by the subscribers hanging up, or clearance of the fault. Further objects for achieving, and achieved by, line lockout, will become apparent from the description of the invention.

In the past permanent signals have been dealt with by arranging that the control equipment connect the permanent signal line to a permanent signal trunk. This trunk is terminated so as to provide a high tone signal to the offending line and so that it behaves as though it were connected to a terminating line in the normal manner and is detected as busy by any subsequent efforts by other subscribers to connect with it.

Typical equipment in which common control central offices are provided are the Northern Electric SA1 cross-bar system, the #5 cross-bar and other similar equipment. Details of the #5 cross-bar system have been published in United States Patent 2,585,904 issued Feb. 19, 1952, (Canadian 496,196) with A. J. Busch as inventor. In describing the invention those parts of the system which are concerned with the line lockout circuit will be shown.

More particularly in accordance with one aspect of the present invention there is provided in a circuit comprising a plurality of communication lines, said lines being accessible to one another, each said line having a sleeve conductor associated therewith, lockout means associated with the sleeve conductor of at least one of said lines and being operable for rendering said first line temporarily inaccessible to said other lines, a marginal relay, said marginal relay including a lead for current flow through said marginal relay, operable means for connecting each said sleeve conductor to said marginal relay lead independenly, current passing through said marginal relay upon connection to one of said sleeve conductors and being of magnitude dependent upon the presence of a said lockout means associated with that said sleeve conductor, said current operating said marginal relay and said lockout means in the presence of the lockout means, and rendering said marginal relay inoperative in the absence of said lockout means, said marginal relay upon operation initiating action for breaking connection between said marginal relay and that said sleeve conductor, and current diverting means for holding said lockout means independently of current flow to said marginal relay lead. The operable means may be a timing relay operable after a time delay, or might for instance be a relay operated by the dialing of a certain digit or combination of digits by the first line or another line, the relay might be operated by other means independently. The lockout relay may be held by a certain reference potential condition on the line, which potential may be controllable by a line user. Other alternative teachings of the invention will be apparent from the disclosure and the claims.

An embodiment of the invention will now be described in which line lockout of permanent signals is achieved, and reference will be made to the accompanying drawings in which.

Figure 1:
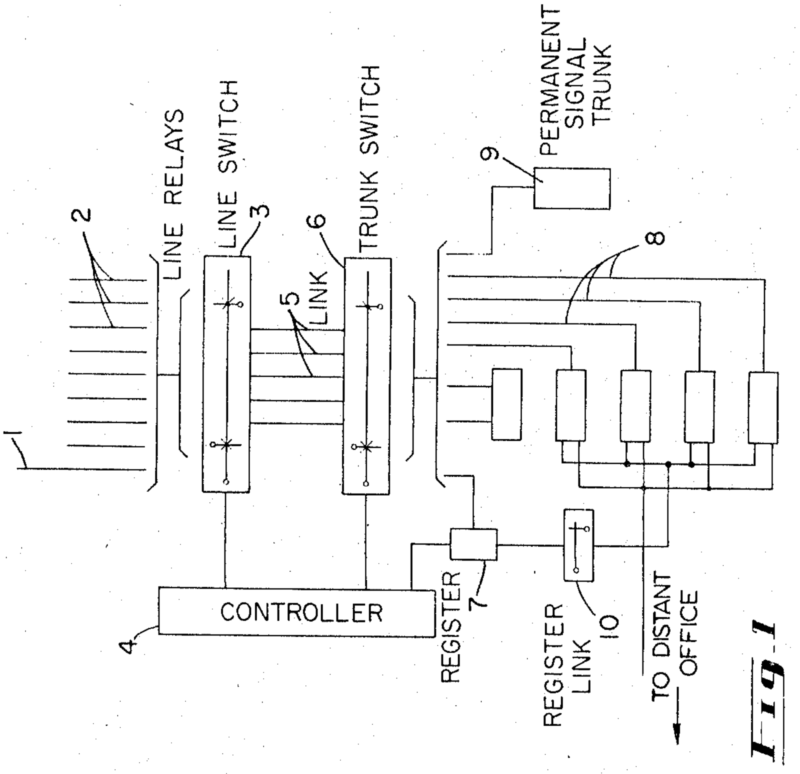
FIGURE 1 shows a simplified layout plan of an SA1 community cross-bar office.

Making reference to FIGURE 1, incoming subscriber lines 1 are led with other test and supervisory lines 2 to line group cross-bar switches 3. Under the action of controller 4 connection through links 5 can be made to trunk group cross-bar switches 6 and thence to a register 7, or to one of a number of outgoing trunks 8. Certain of the trunks 8 provide for additional services such as direct distance dialing, inter- or intra-office calls (i.e. calls to other offices or within the same office). A further trunk 9 is a permanent signal holding trunk to which lines with permanent faults to ground, shorts, or permanent off-hook signals may be connected by the controller 4 after a prescribed delay time.

On a call originating with one of the subscriber's lines 1, an off-hook signal operates the line relay (not shown in FIGURE 1) for the line switch 3 for that line and starts the controller 4 which connects the register 7 to the line via one of the links 5 and trunk switch 6, and puts the dial tone on the line. The controller then releases. The register receives and stores the dialing pulses which follow then, for intra-office calls, seizes the controller, and transmits the information to it in a form which enables the controller to identify the called line. The controller tests it for idleness and connects the calling line to the called line. On outgoing calls the register seizes an idle outgoing trunk via the register link 10 after the necessary number of digits to identify the destination of the call has been fed into it. It transmits the remaining digits to the trunk and then seizes the controller to connect the calling line directly at the switch 6 to the trunk which the register link has seized. The register and then the controller release.

For incoming calls the register is seized by the incoming trunk through the register link 10. When it has received the necessary identifying digits it causes the controller to connect the incoming trunk to the called line at switches 6 and 3 respectively. Ringing current is applied to the called line, the hold magnet on the line switch for that line is operated and held by the incoming line. The controller then releases.

In the SA1 and the #5 cross-bar system mentioned above there is provision for causing the register to seize the controller after a certain prescribed delay if a call is not started (in a dial tone connection) or if it is not completed, and for the controller to be instructed to connect the offending line to a permanent signal trunk 9. Nevertheless for originating calls where a permanent develops, one link 5, a position on the trunk switch 6, and a permanent signal trunk are all held up. This can cause problems in heavy traffic because the links 5 and trunk switches 6 are in high demand and the permanent signal trunk 9 must be of higher capacity than otherwise. On those subscriber's lines which are expected through experience to have permanent faults most frequently, such as on multi-party, open wire, and private company lines, it would be desirable to be able to isolate the offending line as early as possible in the system.

Figure 2:
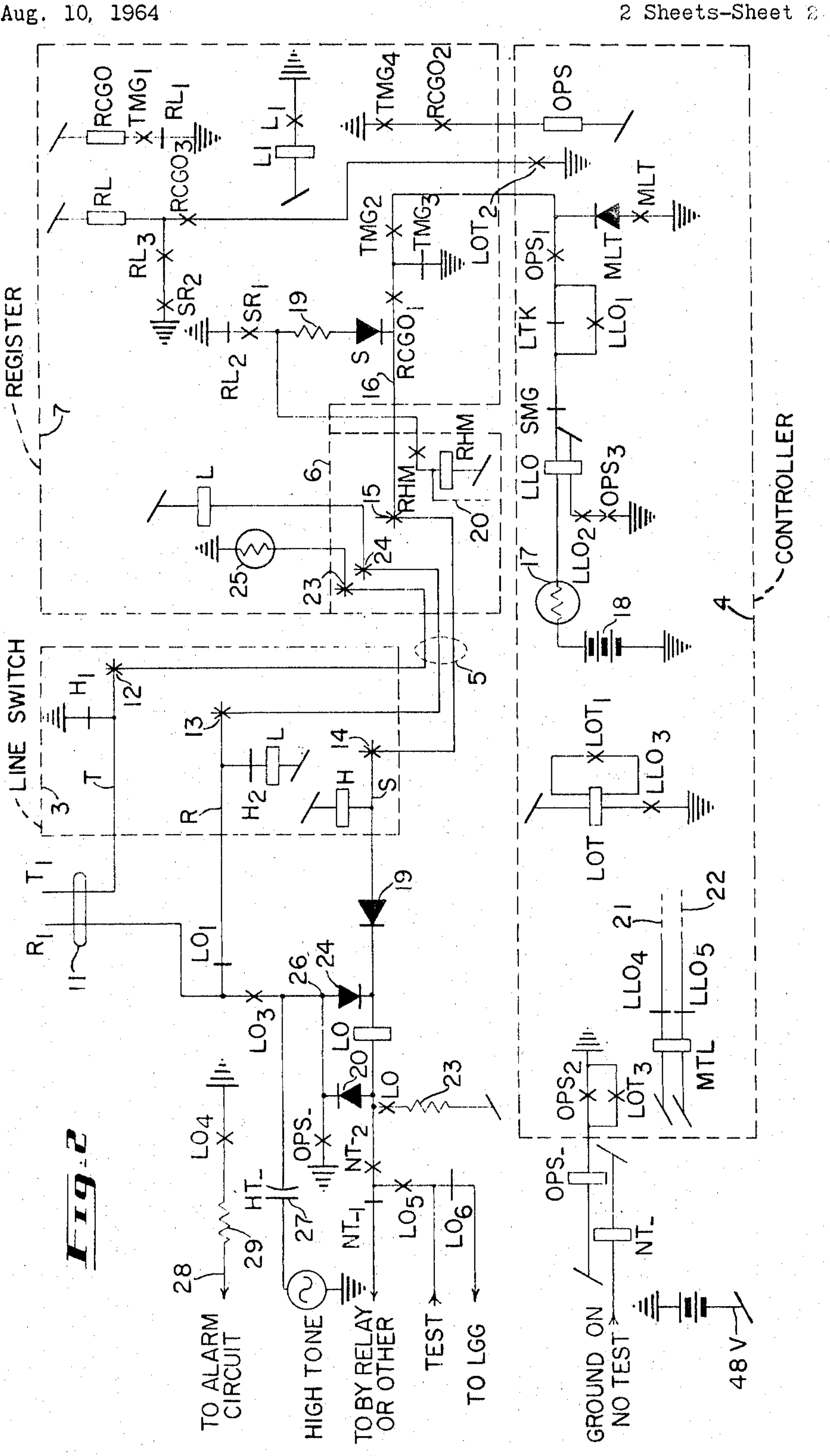
FIGURE 2 shows one incoming line with associated circuitry, and its connections with the register and controller during line lockout.

In practising the present invention, and having reference to FIGURE 2 the circuitry associated with line lockout provisions for those lines sensitive to a permanent signal condition is shown. The subscriber's line 11 comprising wires T1 and R1 is brought into the central office and is connected to lead T and through on-normal contacts $LO_1$ of the lockout relay LO and to lead R connecting to the line switch 3. The action of an off-hook signal appearing on line 11 consists in shorting lines T1 and R1. Since the hold relay H is unoperated, off-normal contacts $H_1$ and $H_2$ of hold relay H allow line relay L— to operate. This initiates action in the controller to connect the line 11 via the line switch 3, idle link 5, and trunk switch 6 to the register 7. In the switch 3 are cross-points 12, 13 and 14 for the wires T, R, and an associated sleeve wire S respectively. While certain cross-points 12, 13 and 14 have been shown it will be appreciated that the actual cross-points chosen by the line switch to set up a link 5 will depend upon the order in which preference to the sets of cross-points has been given on the line switch frame, and also upon which cross-points are already in use. The controller then grounds the S lead which operates hold magnet H. The link 5 then passes to the trunk switch frame 6 where it has access to all the trunks on the frame. The S lead of link 5 has been shown connected at cross-point 15 in the trunk group switch 6 to the register trunk S lead 16. There are also cross-points 23 and 24 associated with the T and R wires. Relay L is connected to cross-point 24 and a ballast lamp 25 in series with ground to crosspoint 23. Each dialing pulse breaks a short between $R_1$ and $T_1$ and releases relay L. The T and R leads are subsequently used for talking connection by means not shown. The S lead passes from the trunk switch cross-points 15 into the register and is grounded through diode S, resistor 19, closed contacts $SR_1$ and contacts $RL_2$. This ground maintains hold magnet H for line switch 3. Hold magnet RHM for trunk switch 6 has also been operated by the initial application of ground on lead 20 and is held through contacts RHM, $SR_1$ and $RL_2$.

In the normal course of events dialing pulses will follow the off-hook signal which the register will receive, then seize the controller and connect the line 11 as determined by the called number. In the event however that a period of between 8 to 24 seconds, (typically) elapses after the start of the off-hook condition, or after partial dialing with no pulses originating from line 11, a timing relay TMG will operate in the register. The timing circuit for relay TMG is operated in such a way that whenever the register is awaiting dialing pulses either initially or between digits a relay RA1 is operated causing the timing circuit to start. In one form, the timing circuit includes a uni-junction transistor in which the stand-off voltage is reached by charging a condenser through a chosen value resistor. The condenser is discharged whenever a dialing digit pulse train is being received by the register.

Figure 3:
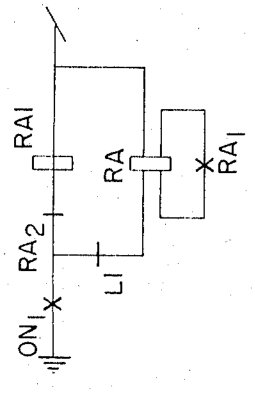
FIGURE 3 shows a schematic diagram of a start circuit for the timing circuit of FIGURE 4.

The timing circuit is initiated by the start circuit of FIGURE 3. Relay L1 (see FIGURE 2) is released every time a dialing pulse is present through the opening of relay L and contacts L. Contacts L1 close when L1 releases. This makes the energizing circuit from battery to ground through contacts $ON_1$ and through the winding of a relay RA. The relay also includes a second winding connected to normally open contacts $RA_1$. The operation of RA breaks contacts $RA_2$ which interrupts the energizing circuit through the winding of a relay RA1 from battery through contacts ON to ground. Thus RA1 is released whenever a dialing pulse occurs. At the end of each pulse, contacts L1 are broken, but because RA releases slowly (by virtue of the closed circuit through contacts $RA_1$) the interruption of current through contacts $RA_2$ is maintained until the end of a train of dialing pulses. RA1 then operates.

Figure 4:
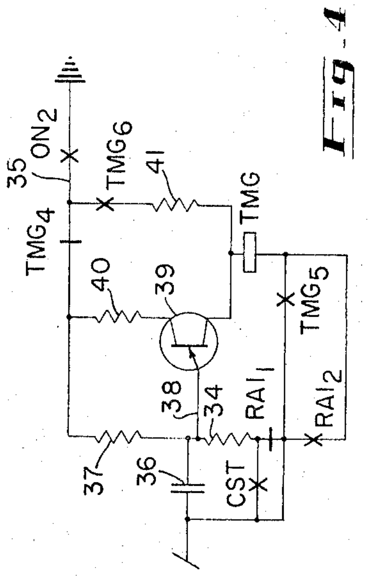
FIGURE 4 shows a schematic diagram of a timing circuit.

A suitable timing circuit is shown in FIGURE 4. When a register is seized and ready to receive digits, RA1 operates. Ground is applied to lead 35 by contacts $ON_2$ and condenser 36 starts to charge through resistor 37. Contacts CST are those of the controller start relay which is not operated at this time. When relay RA1 is released (which occurs whenever the dial pulses are being received) contacts $RA1_1$ close and discharge the condenser 36 through resistor 34. After a certain length of time, determined by the capacity of condenser 36 and the resistance of 37, during which RA1 has remained unoperated, the potential on emitter lead 38 of unijunction transistor 39 becomes sufficiently positive to cause the transistor to strike, current then flows from ground on lead 35 through contacts $TMG_4$ resistor 40, the base of transistor 39, relay TMG winding, contacts $RA1_2$ to negative battery. When TMG makes, holding current flows from wire through $TMG_6$ resistor 41, the winding of relay TMG and contacts $TMG_5$ to negative battery.

The contacts CST of the controller start relay are closed when the controller is seized by the register (for whatever cause) to prevent any subsequent operation of the timing circuit whilst the register is being serviced by the controller.

Referring back to FIGURE 2, the closing of contacts $TMG_1$, completes the circuit from battery through the winding of relay RCGO and contacts $RL_1$ to ground and operates relay RCGO. The closing of $RCGO_1$ and of timing contacts $TMG_2$ simultaneously with the opening of contacts $TMG_3$ removes ground from the sleeve lead S in the register and gives it access to controller 4. The OPS relay in the controller is operated through the closing of contacts $RCGO_2$ and $TMG_4$ which, makes the off-normal contacts $OPS_1$. The S lead is then extended through the on-normal contacts LTK, bridged by off-normal contacts $LLO_1$, through on-normal SMG to one winding of marginal relay LLO. The other side of the winding is connected through current limiting ballast lamp 17 to a positive voltage source, typically about 130 volts. Diodes S and MLT will thus become back biassed and effectively disconnected from the S lead. The function of contacts LTK and SMG is explained below. When OPS operates contacts $OPS_2$ cause permanent signal relay OPS_ to operate and close contacts OPS_. In general a single OPS_ relay will be provided for ten incoming lines with one set of OPS_ contacts for each line.

Now in line circuits in which there is no lockout provision, the only connection to the S lead adjacent the position where the line 11 enters the office will be at the line switch through the hold magnet H. Marginal relay LLO is chosen so that its operating current is such that in this condition insufficient current flows from the positive voltage source 18 onto the S lead to operate the relay. However when line lockout provisions are present current from source 18 can also flow from the S lead through diode 19, lockout relay LO, diode 20, through contacts OPS_ to ground. This additional current is sufficient to cause relay LLO to operate. The operation of relay LLO completes a holding circuit through its second winding, off-normal contacts $LLO_2$ and off-normal contacts $OPS_3$. The contacts $LLO_3$ are also closed causing a slow release relay LOT to become energized. A second winding on the LOT relay is shorted through off-normal contacts $LOT_1$ to allow for the slow release.

By interrupting ground on lines 21 and 22, the opening of contacts $LLO_4$ and $LLO_5$ prevents operation of, or releases, relay MLT in the controller which halts the normal process of a call. Thus had there not been lockout provision for line 11, MLT would have allowed the controller to connect line 11 to a permanent signal trunk. Contacts SMG are broken only when the controller starts to select a permanent signal trunk (which would happen if the line 11 did not have lockout provision.) This removes LLO from the S lead. Since in this condition MLT is operated the diode MLT and contacts MLT can put marking ground on the S lead. Checking relay LTK operates when MLT operates and isolates LLO from the S lead. Thus contacts SMG and LTK serve to provide a time interval during which LLO must operate, if it is going to do so.

Now the operation of relay LOT also closes off-normal contacts $LOT_2$ which, via closed contacts $RCGO_3$, causes relay RL in the register to close. Relay RL is held through contacts $SR_2$ and $RL_3$. The operation of RL releases RCGO by opening contacts $RL_1$ and by breaking contacts $RL_2$ prevents ground being applied to the sleeve lead S by diode S· resistor 19 and contacts SR, and removes ground from relay RHM. The trunk switch hold magnet RHM and the line hold magnet H thus release. The S lead connection between the line switch and the register 7, is thus broken at both points 14 and 15. Contacts $SR_1$ and $SR_2$ are in closed position during this stage by operation of the supervisory slow release relay SR (not shown). This relay is the last one in the register to release, and starts to release when RL operates. After release of the S lead, relay LO remains held by current flowing from negative battery through contacts $LO_2$ through LO thence through diode 24, and contacts OPS_ to ground.

Now when contacts $RL_1$ are broken through operation of RL, RCGO releases and opens contacts $RCGO_2$. OPS then releases. Relay LLO subsequently releases with the breaking of contacts $OPS_3$. Relay LOT which is slow releasing thereby starts to release since contacts $LLO_3$ are broken. During the period when the hold magnets H and RHM are releasing and before ground is applied to the R1 lead either through the off-hook condition, or a short between T1 and R1 or through a false ground on wire R1, the relay LO is held through the contacts OPS_. (OPS_ will not release until $LOT_3$ contacts open.) Relay LOT releases suffiiciently slowly that the release of the hold magnets and of switch 3 is complete, and ground is established at point 26 by virtue of the closing of contacts $H_1$ before relay OPS_ releases and opens contacts OPS_. The pround at point 26 holds relay LO from negative battery through resistor 23, contacts $LO_2$, diode 24, and contacts $LO_3$ until such time as the subscriber's receiver is replaced or the ground on line R1 is otherwise removed. The diodes 20 and 24 are required to avoid the reversal of current through the winding of LO when the holding of this relay changes from the positive potential on the S lead to negative battery through resistor 23.

The register and controller are now both released and the line is locked out by the operation solely of relay LO. The opening of on-normal contacts $LO_1$ prevents re-energizing of the line relay L and subsequent connection to a register. High tone is placed on line R1 through a condenser 27 and the contacts $LO_3$. The closing of contacts $LO_4$ provides a given resistance to ground on alarm wire 28 by virtue of resistance 29. The value of resistance 29 is selected so that when a chosen number of lines becomes locked out an alarm is sounded.

On a non-no test call, that is the normal call, the controller in an attempt to get through to the line 11, after receiving details of the called number from an associated register, applies ground onto the lead LN (by means not shown). When the line 11 is locked out relay contact $LO_5$ is closed and contact $LO_6$ is open. The ground is therefore diverted through contacts $NT_{-1}$ to lead LO whence the busy relay BY in the controller is operated and the calling party is given the busy signal. If the line is not locked out relay contacts $LO_6$ are closed and $LO_5$ are open and the ground is transmitted back over lead LG to operate the line group relay LGG in the line switch circuit 3, and the call is completed in normal manner.

On no-test calls, that is those placed by maintenance crews or by the operator to determine the reason for a busy signal being applied to a normall call, the relay NT (not shown) in the controller will be operated and relay NT_ will close by the application of ground on lead NT. When the ground applied on lead LN is transmitted via contacts $LO_5$ and $NT_{-2}$ the winding of relay LO is shunted down by the appearance of ground at point 31. This causes relay LO to release and by the closing of relay contacts $LO_1$ the line R1 lead becomes connected to the R wire and connection can be made to the line at the line switch 3. In general one NT_ relay is provided for each ten incoming lines with one set of $NT_{-1}$ and $NT_{-2}$ contacts for each line. After the no-test call is completed the line will not be locked out and it will then go through the full cycle of seizing a register and being placed in the locked out condition after operation of the timing circuit.

While the foregoing description has shown the locking out of a line on which a permanent signal has developed, in some instances the appearance of a permanent could be used to divert incoming calls not to the BY relay but to a chosen other line, such as a second line for that subscriber or a recorded announcement or an operator's position. As another alternative, lock out or diversion could be initiated not by timing out the relay TMG but by arranging such a relay to be operated if a specific digit or combination of digits were dialed.

We claim:

1. In a circuit in which a reference potential condition may exist on a conductor and wherein a timing circuit is operable to be reset whenever the potential on said conductor is varied from said reference potential in a chosen manner, a second conductor associated with the first mentioned conductor, a lockout relay connected to said second conductor, a marginal relay, said timing circuit being operable after a given time interval to connect said marginal relay to said second conductor, for passing current through said marginal relay, said current being of a magnitude dependent upon the said lockout relay being connected to said second conductor, said current operating said marginal relay and the said lockout relay, said marginal relay initiating action for breaking connection between said marginal relay and the said lockout relay and current diverting means operated by the said lockout relay for holding the said lockout relay by current flow from said first conductor, whilst said reference potential condition persists.

2. Apparatus as defined in claim 1 including a third conductor associated with the first conductor, means for establishing a known potential on said third conductor, said first conductor achieving said reference potential by connection to the third conductor.

3. Apparatus as defined in claim 2 wherein said known potential is ground potential.

4. Apparatus as defined in claim 1 wherein said diverting means includes a unidirectional conducting device.

5. Apparatus as defined in claim 2 including a permanent signal relay for temporary connection of current flow through said lockout relay, and means for holding said permanent signal relay whilst said known potential establishing means is operating.

6. Apparatus as defined in claim 5 wherein the holding means includes a slow release relay, operatively connected for holding said permanent signal relay.

7. Apparatus as defined in claim 6 comprising contact means being closed by operation of said marginal relay and means series connecting said slow release relay with said contact means.

8. In a circuit comprising a plurality of communication lines, means for individually connecting each of said lines to one another, each said line having a sleeve conductor associated therewith, lockout means connected to the sleeve conductor of at least one of said lines and being operable for rendering said one line temporarily inaccessible to said other lines, a marginal relay, said marginal relay including a lead for current flow through said marginal relay, operable means for connecting each said sleeve conductor to said marginal relay lead independently, current passing through said marginal relay upon connection to one of said sleeve conductors and being of magnitude dependent upon the connection of a said lockout means to that said sleeve conductor, said current operating said marginal relay and said lockout means when connected to a said sleeve conductor to which a said lockout means is connected, and said current being insufficient for operating said marginal relay when connected to a said sleeve conductor having no said lockout means, said marginal relay upon operation initiating action for breaking connection between said marginal relay and the sleeve conductor to which is connected and current diverting means for holding said lockout means independently of current flow to said marginal relay lead.

9. Apparatus as defined in claim 8 said operable means comprising a second relay, said second relay being operable, after a time delay following attempted connection of one of said lines to another of said lines for connecting the sleeve conductor of said one line to said marginal relay lead.

10. Apparatus as defined in claim 8 said operable means comprising digit information sensitive means, each said line being operatively connectible for transmitting digit information to said operable means.

11. Apparatus as defined in claim 9 including a central exchange, each said line being operatively connectible for transmitting connection information to said exchange for subsequent connection to another of said lines, means controlling said second relay and being sensitive to the presence of transmitted connection information, and means for operating said second relay after a time delay following incomplete transmission of said connection information to said exchange.

12. In a telephone system comprising a plurality of lines, and a central exchange, each said line being connectible through said central exchange to another of said lines, said exchange comprising a sleeve lead associated with each said line, a register including a sleeve lead independently connectible with each said line for receiving connection information from any one of said lines for connection of that line with any other of said lines, said line sleeve lead and said register sleeve lead being connectible together, a lockout relay connected to the sleeve lead of at least one of said lines being operable for rendering said one line inaccessible to said other lines, a marginal relay, said marginal relay including a lead for current flow through said marginal relay, operable means associated with said register for connecting its said sleeve lead to said marginal relay lead, current flowing through said marginal relay upon connection of the marginal relay lead to said relay sleeve lead being of a magnitude determined by said lockout relay said current when said marginal relay is connected to the sleeve lead having the lockout relay connected thereto operating said marginal relay, and said current being insufficient for operating said marginal relay, when said marginal relay is connected to a sleeve lead having no lockout relay connected thereto, said lockout relay being operated by current flow through said register and line sleeve leads from said marginal relay, said marginal relay upon operation initiating action for breaking connection between said lockout relay, said register and said marginal relay, and current diverting means for holding said lockout relay dependent upon the state of said one line, said lockout relay upon operation rendering said line inaccessible to said other lines.

13. Apparatus as defined in claim 12 said operable means comprising a timing relay, said timing relay being operated for connecting said last mentioned sleeve lead to said marginal relay lead after a time delay during which said register is connected to said line and receiving incomplete connection information.

14. Apparatus as defined in claim 12 comprising a timing means for said timing relay, said timing means being operatively connected for operating said timing relay after said time delay, and means sensitive to connection information transmission from said one line for resetting said timing means whenever connection information is being received from said one line.

References Cited

UNITED STATES PATENTS

| | | | |
|---|---|---|---|
| 2,650,950 | 9/1953 | Kessler | 179—18 |
| 2,826,640 | 3/1958 | Williford | 179—22 |
| 2,959,642 | 11/1960 | Dubuar | 179—18 |

WILLIAM C. COOPER, *Primary Examiner.*

KATHLEEN H. CLAFFY, *Assistant Examiner.*